H. WILCOX.
MOTOR VEHICLE, TRAILED POWER.
APPLICATION FILED JAN. 28, 1920.
1,401,661.
Patented Dec. 27, 1921.
2 SHEETS—SHEET 1.
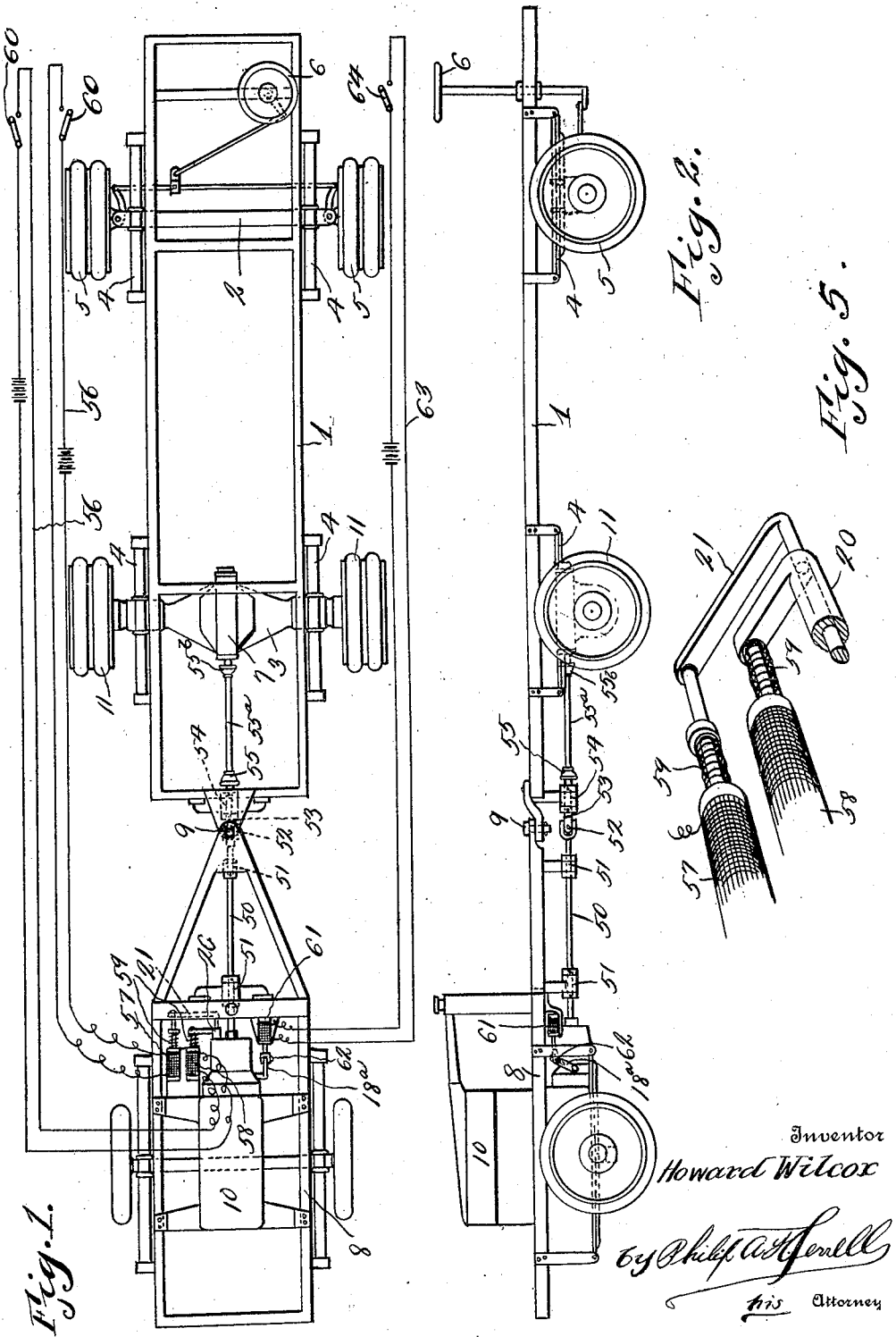
Inventor
Howard Wilcox
by Philip A. Merell
his Attorney

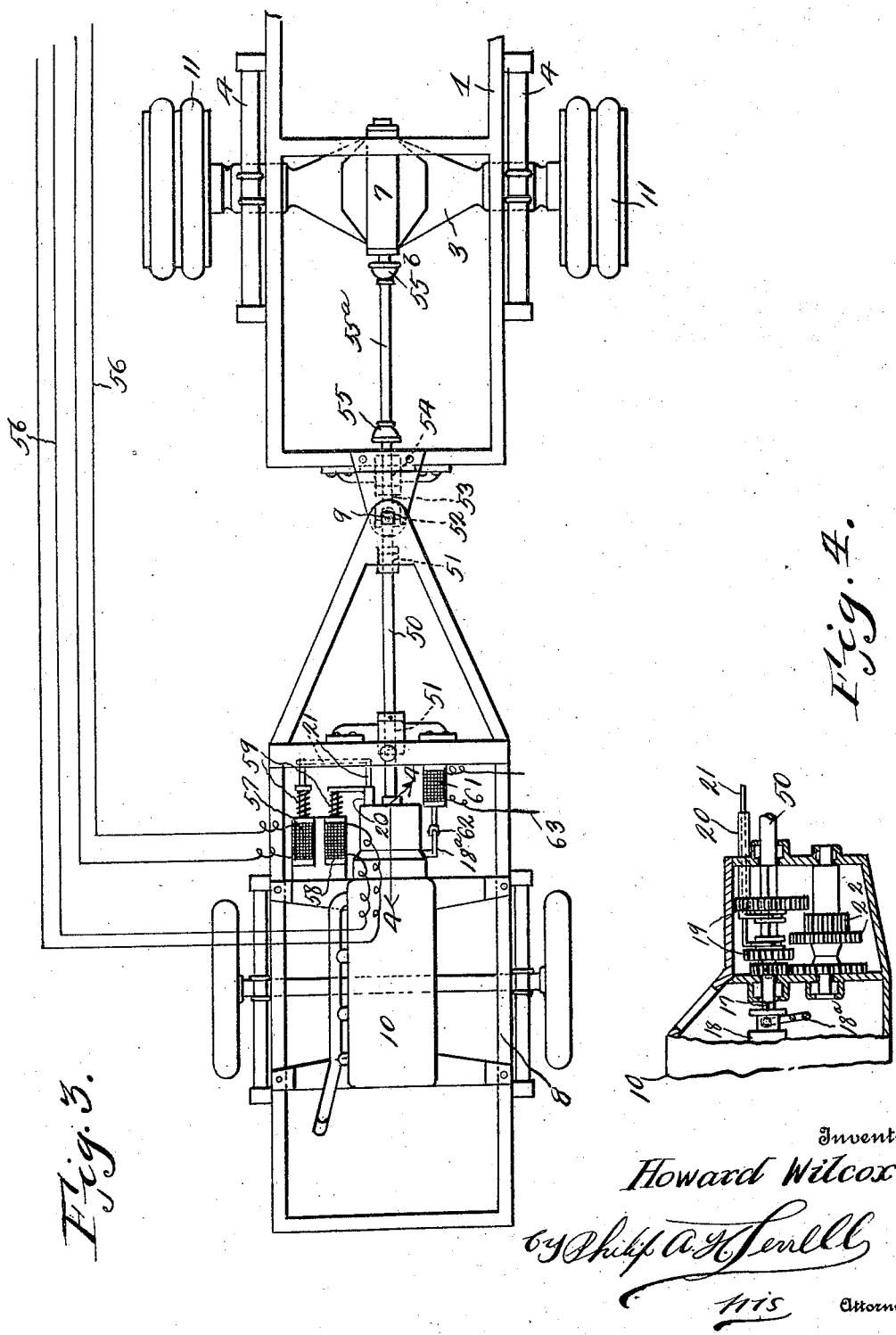

UNITED STATES PATENT OFFICE.

HOWARD WILCOX, OF WOODSTOCK, NEW YORK.

MOTOR-VEHICLE, TRAILED POWER.

1,401,661.             Specification of Letters Patent.     Patented Dec. 27, 1921.

Application filed January 28, 1920. Serial No. 354,684.

*To all whom it may concern:*

Be it known that I, HOWARD WILCOX, a citizen of the United States, residing at Woodstock, in the county of Ulster and State of New York, have invented certain new and useful Improvements in Motor-Vehicles, Trailed Power, of which the following is a specification, reference being had therein to the accompanying drawing.

The invention relates to motor driven vehicles and has for its object to provide a vehicle of this character wherein the power utilized for driving the vehicle is carried on a separate vehicle, the power from said separate vehicle being utilized to drive the wheels of the load carrying vehicle.

A further object is to provide a motor driven vehicle, wherein the motor for driving said vehicle is carried on a separate conveyance, and power from said motor on said separate conveyance transmitted to the load carrying vehicle through differential and clutch mechanisms, carried by the load carrying vehicle. Also to provide means whereby the motor on the separate vehicle may be controlled from the load carrying vehicle.

A further object is to provide a motor driven vehicle wherein the power for driving said vehicle is trailed on a separate conveyance, thereby allowing the trailed vehicle, on which the power is located, to be disconnected and used for driving other vehicles while the front vehicle is being unloaded. By trailing the power on a detachable conveyance, several load carrying vehicles can be used in connection with one power plant, thereby permitting unloading of one load carrying vehicle while another is in transit.

A further object is to get the maximum work out of a single power plant, which power plant may be shifted from one load carrying vehicle to another, said power plant being capable of use with various types of load carrying vehicles with a single investment for power plant.

A further object is to provide a motor driven vehicle, wherein the power for driving the same is trailed on a separate conveyance behind the load carrying vehicle, said power comprising a unit power plant and to provide means whereby the unit power plant may be controlled from the load carrying vehicle.

With the above and other objects in view the invention resides in the combination and arrangement of parts as hereinafter set forth, shown in the drawings described and claimed, it being understood that changes in the precise embodiment of the invention may be made within the scope of what is claimed without departing from the spirit of the invention.

In the drawings:—

Figure 1 is a plan view of the motor driven vehicle, showing a unit power plant located on a trailed vehicle.

Fig. 2 is a side elevation of the vehicle and trailed power plant.

Fig. 3 is an enlarged view of the rear end of the vehicle and trailed vehicle on which the power plant is carried.

Fig. 4 is a sectional view through the transmission taken on line 4—4 of Fig. 3.

Fig. 5 is a perspective view of the transmission control levers, showing the solenoids for controlling the same.

Referring to the drawings, the numeral 1 designates the frame of a conventional form of automobile, preferably of a truck, and 2 and 3 the front and rear axles thereof, said frame being supported on said axles by means of springs 4. The wheels 5 at the front end of the vehicle are controlled for purposes of steering by means of a steering wheel 6 connected to a conventional form of steering mechanism. The rear axle 3 is of a conventional structure, and is provided with a conventional form of axle drive mechanism located in the casing 7.

A trailed vehicle, preferably of a two wheeled type is provided, said vehicle being designated by the numeral 8. The forward end of the trailed vehicle is preferably V-shaped and is pivotally secured as at 9 to a bracket secured on the rear end of the frame 1 of the front vehicle, there it will be seen that the vehicle 8 is trailed by the front vehicle. Secured to the frame of the trailed vehicle is a conventional form of internal combustion engine 10, which is adapted to drive the wheels 11 at the rear end of the front vehicle. Engine 10 is of the unit power plant type and is provided with clutch and transmission, rotary motion being imparted to the transmission shaft 17 through a slidable clutch member 18, so that power may be utilized from the engine 10 as desired. Transmission shaft 17 is of conventional form and is provided with slidable change speed gears 19, which are controlled by slidable levers 20 and 21, by means of which levers 20 and 21, the change speed gears 19 may be moved as desired into and out of engagement with gears 22 so that various speeds may be imparted to the drive shaft 50, which is rotatably mounted in bearings 51 carried on the under face of the trailed vehicle 8, the forward end of said drive shaft 50 being universally connected as at 52 to a stub shaft 53, which is rotatably mounted in a bearing 54 carried by brackets secured to the rear end of the front or load carrying vehicle. The inner end of the stub shaft 53 is universally connected as at 55 to the drive shaft 55$^a$, which drive shaft is in turn connected as at 55$^b$ by means of a universal joint to the axle drive mechanism of the front vehicle. It will be seen that when the clutch member 18 is in engagement that power from the engine 10 will be transmitted through the transmission, drive shaft 50, stub shaft 53, drive shaft 55$^a$, and through the axle drive mechanism to the wheels 11, thereby forcing the front vehicle forwardly. The various speeds of rotation of drive shafts 50 and 55$^a$ are attained through the variable speed driven to the drive shaft 50 through the transmission mechanism.

The transmission controlled levers are controlled through electric circuits 56 which energize solenoids 57 and 28. The solenoid 57 being connected to the control lever 21 of the transmission and the solenoid 58 connected to the control lever 22 of the transmission, there being springs 59 for normally holding said control levers 21 and 22 in position so that the transmission will be out of operation. However, said solenoids 57 and 58 may be energized to shift the gears 19. Circuits 56 are controlled by means of switches 60 located on the forward end of the front vehicle and within easy reach of the operator. Clutch lever 18$^a$ is rocked for throwing the clutch 18 into and out of operation by means of a solenoid 61, which is connected as at 62 to the lever 18$^a$. The solenoid 61 is energized as desired by an electric circuit 63 which is provided with a switch 64, which switch is also located at the forward end of the front vehicle and within easy reach of the operator.

From the above it will be seen that a motor driven vehicle is provided wherein the power for propelling the same is trailed on a separate vehicle and one wherein the entire power plant, including the clutch and transmission mechanism is carried on the trailed vehicle. It will also be seen that said power plant is controlled from the front vehicle.

The front or load vehicle having been propelled to any desired place, the trailed vehicle on which the power plant is disposed may be disconnected and connected to another load vehicle, thereby avoiding the necessity of having an idle power plant. By providing a power plant trailed on a separate vehicle it will be seen that the front or load vehicle may receive its maximum load, which would not be the case if the engine were located on the load vehicle.

The invention having been set forth what is claimed as new and useful is:—

1. A motor driven vehicle comprising a main load carrying vehicle and a trailed vehicle, a unit power plant carried on the trailed vehicle and means whereby the entire power from said unit power plant on the trailing vehicle may be utilized for driving the wheels of the main vehicle through shafting connected to the differential of the main vehicle.

2. A motor driven vehicle comprising a main load carrying vehicle and a trailing vehicle, a motor carried by the trailing vehicle, clutch and transmission mechanisms carried by the trailing vehicle, shafting connecting the motor to the differential of the main vehicle, and means whereby said clutch and transmission mechanisms may be controlled from the front end of the main vehicle.

3. A motor driven vehicle comprising a main load carrying vehicle and a trailing vehicle, a motor carried by the trailing vehicle, shafting connecting said motor to the differential of the rear axle of the main vehicle, and means whereby power from the motor on the trailing vehicle may be controlled from the forward end of the main vehicle.

4. A motor driven vehicle comprising a main load carrying vehicle and a trailing vehicle, a unit power plant located on said trailing vehicle, means comprising shafting supported in bearings on the main and trailing vehicles connecting the power plant and the wheel driving mechanism of the main vehicle and means whereby the speed of said shafting may be controlled from adjacent the forward end of the main vehicle.

5. A motor driven vehicle comprising a main load carrying vehicle and a trailing vehicle, a unit power plant located on said trailing vehicle, shafting extending forwardly from the unit power plant, said shafting being universally connected to a drive shaft, said universal connection being in vertical alinement with the connection between the main and trailing vehicles, said drive shaft being in turn connected to the differential of the axle of the main vehicle, and means for controlling the power transmitted from the unit power plant to the main vehicle by the operator on the main vehicle.

In testimony whereof I hereunto affix my signature.

HOWARD WILCOX.